United States Patent [19]

Kammerer

[11] 3,977,484

[45] Aug. 31, 1976

[54] ELECTRONIC SCALE APPARATUS WITH DEAD WEIGHT CALCULATING MEANS

[75] Inventor: Manfred Kammerer, Albstadt 1-Ebingen, Germany

[73] Assignee: August Sauter GmbH, Albstadt 1-Ebingen, Germany

[22] Filed: May 23, 1975

[21] Appl. No.: 580,209

[30] Foreign Application Priority Data

May 24, 1974 Germany.............................. 2425107

[52] U.S. Cl............................. 177/165; 177/DIG. 3
[51] Int. Cl.² ......................................... G01G 23/14
[58] Field of Search .......... 177/46, 25, 165, DIG. 3; 235/151.33

[56] References Cited
UNITED STATES PATENTS

| | | | |
|---|---|---|---|
| 3,684,875 | 8/1972 | Smith et al.................... | 177/165 UX |
| 3,731,754 | 5/1973 | Godwin et al. ...................... | 177/165 |
| 3,777,828 | 12/1973 | Dietemeyer.......................... | 177/165 |
| 3,812,923 | 5/1974 | Rock............................... | 177/165 X |
| 3,853,267 | 12/1974 | Cadwell et al.................. | 235/151.33 |
| 3,869,005 | 3/1975 | Williams, Jr. et al........... | 177/165 X |
| 3,888,321 | 6/1975 | Wiiki et al. .......................... | 177/165 |

*Primary Examiner*—George H. Miller, Jr.
*Attorney, Agent, or Firm*—Ernest F. Marmorek

[57] ABSTRACT

An electronic scale apparatus for use in determining the net weight of an object placed on a weighing scale features selecting means operable for generating a digital signal corresponding to the dead weight of the object, digital to analog conversion means coupled to the selecting means and operable for producing a first analog signal corresponding to the digital signal, the weighing scale being operable for producing a second analog signal corresponding to the gross weight of the object, a differential amplifier coupled to the conversion means and to the weighing scale and being operable for producing a third analog signal substantially equal to the difference between the first and second analog signals, whereby the third analog signal represents the net weight of the object.

4 Claims, 2 Drawing Figures

ELECTRONIC SCALE APPARATUS WITH DEAD WEIGHT CALCULATING MEANS

FIELD OF THE INVENTION

The present invention relates to an electronic tare or dead weight calculating device for scales in which the brutto or gross weight value is present in the converted form of an analog electrical voltage or current signal and the dead weight value becomes subtracted from such weight value.

BACKGROUND OF THE INVENTION

There are devices and methods known according to which an electrical analog signal corresponding to the dead weight becomes subtracted from the gross weight and the difference voltage becomes processed further. The analog voltage corresponding to the dead weight value according to such known arrangement is produced by means of a potentiometer. In practice there have been difficulties encountered with such known apparatus in that in the event high accuracy is required an expansion in the magnitude of $10^3$ to $10^4$ cannot be set in a simple fashion to be represented with voltages which would be delicately sensitive and constant in nature.

SUMMARY OF THE INVENTION

It is, therefore, an object of the present invention to provide an improved apparatus for scales in which the dead weight value can be subtracted from the gross weight in an improved manner eliminating the advantages of heretofore known apparatus.

It is a further object of the present invention to provide an electronic dead weight calculating apparatus for sclaes in which the dead weight value can be calculated to a high accuracy in a simple fashion and requiring only a relatively small technical and electronic outlay and in which the above-mentioned disadvantages of known devices are eliminated.

BRIEF DESCRIPTION OF THE DRAWINGS

The present invention will become more readily apparent from the following description of preferred embodiments thereof shown in the accompanying drawings, in which.

DESCRIPTION OF THE PREFERRED EMBODIMENTS

Figure 1:
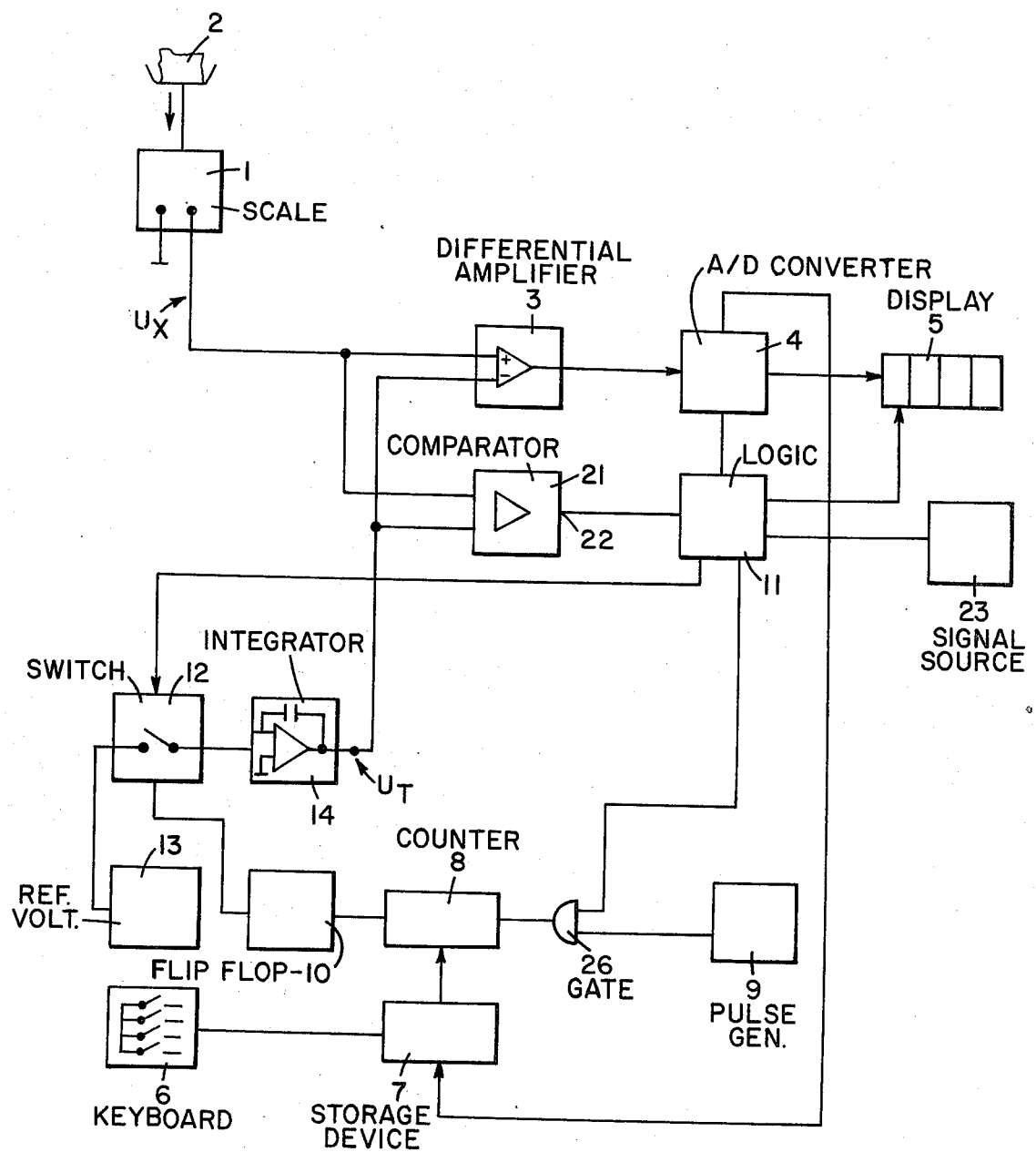
FIG. 1 is a schematic representation of a scale showing in block diagram form the details of the dead weight calculating arrangement according to the present invention.

With reference to FIG. 1 it is noted that the scale 1 itself is only schematically illustrated. At the output of scale 1 an electrical proportional voltage UX appears which corresponds to the weight 2 placed on the scale 1. Such voltage UX is fed into a differential amplifier 3 which in the illustrated embodiment after having been converted in an analog/digital convertor 4 appears at the display device 5 as the digital value of the gross weight. On a keyboard 6 a dead weight can be introduced which is then supplied into a storage device 7 which in turn transfers such digital value of the dead weight into a counter device 8. The counter device 8 is supplied over a gate device 26 by a clock pulse generator 9 having a constant frequency. The counter device 8 counts from such train of constant frequency pulses a certain number of pulses and, namely so many of such pulses, which correpsond to the digital value of the dead weight fed into the keyboard device 6. After such number has been counted by the counter 8 a flip-flop device 10 then becomes set which, in turn, will open an electronic switching means 12 which became closed at the beginning of the counting of the pulses by the counter 8 by means of a logic circuit 11. Such electronic switching device 12 will feed the reference voltage 13 to an integrating device 14 for a time period which corresponds to the counter period of the pulses by the counter 8.

At the output of the integrating device 14 a voltage $U_T$ appears which is proportional to the pulse number counted by the counter 8 and, thereby, it is proportional to the dead weight value fed into the keyboard device 6. Such voltage $U_T$ becomes subtracted in the differential amplifier 3 from the voltage UX which is proportional to the gross weight so that at the output of the differential amplifier 3 the voltage $UX-U_T$ appears which represents the gross weight less the dead weight and which equals to the net weight of the ware being measured.

The analog/digital converter 4 will convert such voltage $UX-U_T$ so that at the display 5 the net weight will appear. The logic device 11 takes care that the conversion of the dead weight value and the conversion of the gross weight value are performed at the proper times.

Figure 2:
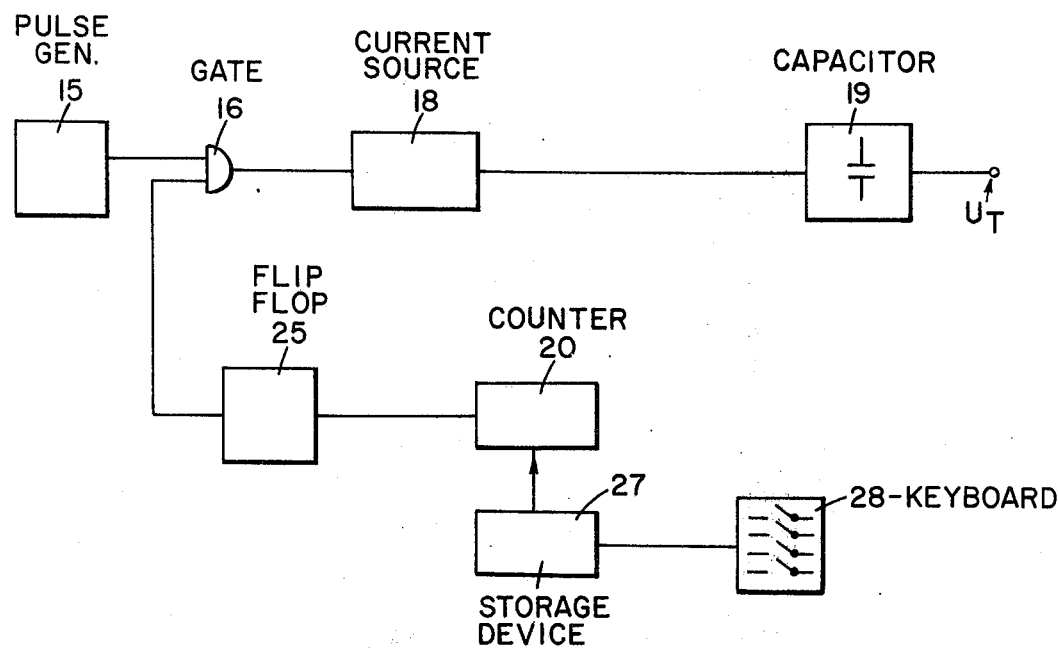
FIG. 2 illustrates an alternate embodiment with respect to FIG. 1.

An alternative embodiment is illustrated in FIG. 2 according to which the analog voltage $U_T$ corresponding to the digital value of the dead weight will not be produced by an integrator which is connected to a reference voltage for a constant time period, but it will be produced by a clock pulse generator 15 which over a gating device 16 supplies pulses to a constant current source 18. Such constant current pulses will be added up in a capacitor 19. The gating device 16 is controlled by a flip-flop device 25 and a counter 20. The storage device 27 and the keyboard 28 are provided to feed the digital value of the dead weight to the counter device 20. The counter device 20 will produce here again a number of pulses which correspond to the digital value of the dead weight so that the capacitor 19 over the gating device 16 and the constant current source 18 will receive a predetermined number of pulses and will produce the woltage output $U_T$. It is within the scope of the present invention that in the event high accuracy is required the analog voltage $U_T$ corresponding to the digital value of the dead weight will be produced not in one instance for a longer time, but as controlled by the logic circuit 11, it is produced periodically after a predetermined time always as new. It is preferred when such operation is synchronized with the conversion of the gross weight value by the analog/digital convertor 4. It is also preferred that the same reference voltage 13 is used for both the analog/digital convertor 4 and for the production of the voltage $U_T$.

Such apparatus and method according to the present invention is very reliable in operation notwithstanding the simplicity of the means employed. According to the invention at any desirable time instant, for example, after the weighing has taken place or after a certain time interval as controlled by the logic device 11, the proportional voltage UX produced by the analog/digital convertor 4 is fed into the storage device 7 as a digital value of the dead weight. Now if the proportional voltage UX which represents the gross weight value is converted through the integrating device 14 into a voltage $U_T$ then the voltage $U_T$ must be equal to the gross value, that is to the voltage UX which is corresponding or proportional to it. If all the components of the circuit operate properly then a comparator device 21 when comparing the volues UX and $U_T$ will produce at its output 22 a signal "0". The logic device 11 will then process such signal "0" further into an OK signal and then the entire apparatus is released for the further measuring process. In the event a "defective" signal is received, then the digital indication in the display device 5 becomes, for example, extinguished and a signal 23 is given as the "defective" signal. From the above it follows that the "defective" signal results when the difference between UX and $U_T$ is other than 0.

In addition to the fact that according to the present invention a dead weight calculating apparatus for scales has been provided with high accuracy and requiring only a small component outlay, a further advantage of the present invention resides in that the analog dead weight voltage which can be given at any desirable accuracy may be used as checking the accuracy of the entire scale in that the measured gross weight is fed into the scale apparatus as the dead weight value and by means of the digital/analog convertor is converted into an analog voltage which is then subtracted from the magnitude of the gross weight earlier converted also into an analog voltage. When all the components of the apparatus operate reliably then a difference voltage 0 must be obtained as above explained. This is therefore a simple and reliable method for testing the entire electronic structure of the scale apparatus.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. An electronic scale apparatus, for use in determining the net weight of an object including a tare placed on a weighing scale, comprising, in combination:
   selecting means operable for generating a digital signal corresponding to the dead weight of said tare;
   digital to analog conversion means coupled to said selecting means and operable for producing a first analog signal corresponding to said digital signal;
   said weighing scale being operable for producing a second analog signal corresponding to the gross weight of said object;
   a differential amplifier coupled to said conversion means and to said weighing scale and being operable for producing a third analog signal substantially equal to the difference between said first and second analog signals, whereby said third analog signal represents the net weight of said object.

2. The apparatus as claimed in claim 1 further comprising a storage means connected between said selecting means and said conversion means and operable for storing said digital signal for a predetermined period of time.

3. The apparatus as claimed in claim 1, wherein said selecting means comprises a signal generator operable for generating a digital code in response to a keyboard, a storage device coupled to said signal generator and operable for storing said digital code, a counter coupled to said storage device, and a pulse generator coupled to said counter and operable for producing a pulse signal, said counter storing pulse signals from said pulse generator corresponding to said digital code, whereby the pulses in said counter become said digital signal.

4. The apparatus as claimed in claim 3, wherein said conversion means comprises a flip-flop coupled to said counter, a reference voltage source, an integrator, and coupling means for coupling said flip-flop and said reference voltage source to said integrator.

* * * * *